(12) United States Patent
Matsuda

(10) Patent No.: US 8,423,996 B2
(45) Date of Patent: Apr. 16, 2013

(54) DELIVERY SYSTEM, SERVER DEVICE, TERMINAL DEVICE, AND DELIVERY METHOD

(75) Inventor: Masaki Matsuda, Ishikawa (JP)

(73) Assignee: PFU Limited (JP)

( * ) Notice: Subject to any disclaimer, the term of this patent is extended or adjusted under 35 U.S.C. 154(b) by 410 days.

(21) Appl. No.: 12/717,248

(22) Filed: Mar. 4, 2010

(65) Prior Publication Data

US 2011/0010703 A1 Jan. 13, 2011

Related U.S. Application Data

(63) Continuation of application No. PCT/JP2009/062694, filed on Jul. 13, 2009.

(51) Int. Cl.
*G06F 9/44* (2006.01)
*G06F 9/445* (2006.01)
*G06F 15/177* (2006.01)

(52) U.S. Cl.
USPC ........... 717/178; 717/172; 717/173; 717/176; 717/177; 709/220; 709/221; 709/222; 713/1; 713/2; 713/100

(58) Field of Classification Search ........................ None
See application file for complete search history.

(56) References Cited

U.S. PATENT DOCUMENTS

| | | | |
|---|---|---|---|
| 6,425,126 B1 | 7/2002 | Branson et al. | |
| 6,438,468 B1 * | 8/2002 | Muxlow et al. | 701/3 |
| 7,584,467 B2 * | 9/2009 | Wickham et al. | 717/171 |
| 7,904,613 B2 * | 3/2011 | Hagiuda | 710/19 |
| 2002/0092006 A1 | 7/2002 | Takeo | |
| 2003/0037328 A1 * | 2/2003 | Cicciarelli et al. | 717/178 |
| 2004/0031029 A1 * | 2/2004 | Lee et al. | 717/171 |
| 2004/0148379 A1 | 7/2004 | Ogura | |
| 2005/0055687 A1 * | 3/2005 | Mayer | 717/173 |
| 2006/0173975 A1 * | 8/2006 | Nose et al. | 709/219 |

FOREIGN PATENT DOCUMENTS

| | | |
|---|---|---|
| JP | 11-306000 A | 11/1999 |
| JP | 2001-005648 A | 1/2001 |
| JP | 2002-268892 A | 9/2002 |
| JP | 2003-005991 A | 1/2003 |
| JP | 2004-139572 A | 5/2004 |
| JP | 2004-185114 A | 7/2004 |
| JP | 2005-352778 A | 12/2005 |
| JP | 2007-052518 A | 3/2007 |

OTHER PUBLICATIONS

PCT/JP2009/062694 International Search Report dated Aug. 25, 2009.

* cited by examiner

*Primary Examiner* — Henry Tsai
*Assistant Examiner* — Michael Sun
(74) *Attorney, Agent, or Firm* — Lowe Hauptman Ham & Berner, LLP

(57) ABSTRACT

A distribution system comprising a server device and a terminal device communicably connected to each other via a network. Wherein, the terminal device transmits an acquisition request of the distribution package to the server device, receives the distribution package from the server device and stores the distribution package, determines whether current date and time is the application start timing based on the application start timing information included in the distribution package, and applies the resource by executing the application script when the current date and time is determined to be the application start timing. And the server device receives the acquisition request of the distribution package from the terminal device, and transmits the distribution package to the terminal device when the acquisition request is received.

10 Claims, 9 Drawing Sheets

FIG.4

| GROUP | DISTRIBUTION TARGET TERMINAL | DISTRIBUTION PACKAGE | CANCEL |
|---|---|---|---|
| GROUP 1 | T001, T002, T003 | P001 | NOT REQUIRED |
| GROUP 2 | T004, T005, T006 | P002 | REQUIRED |

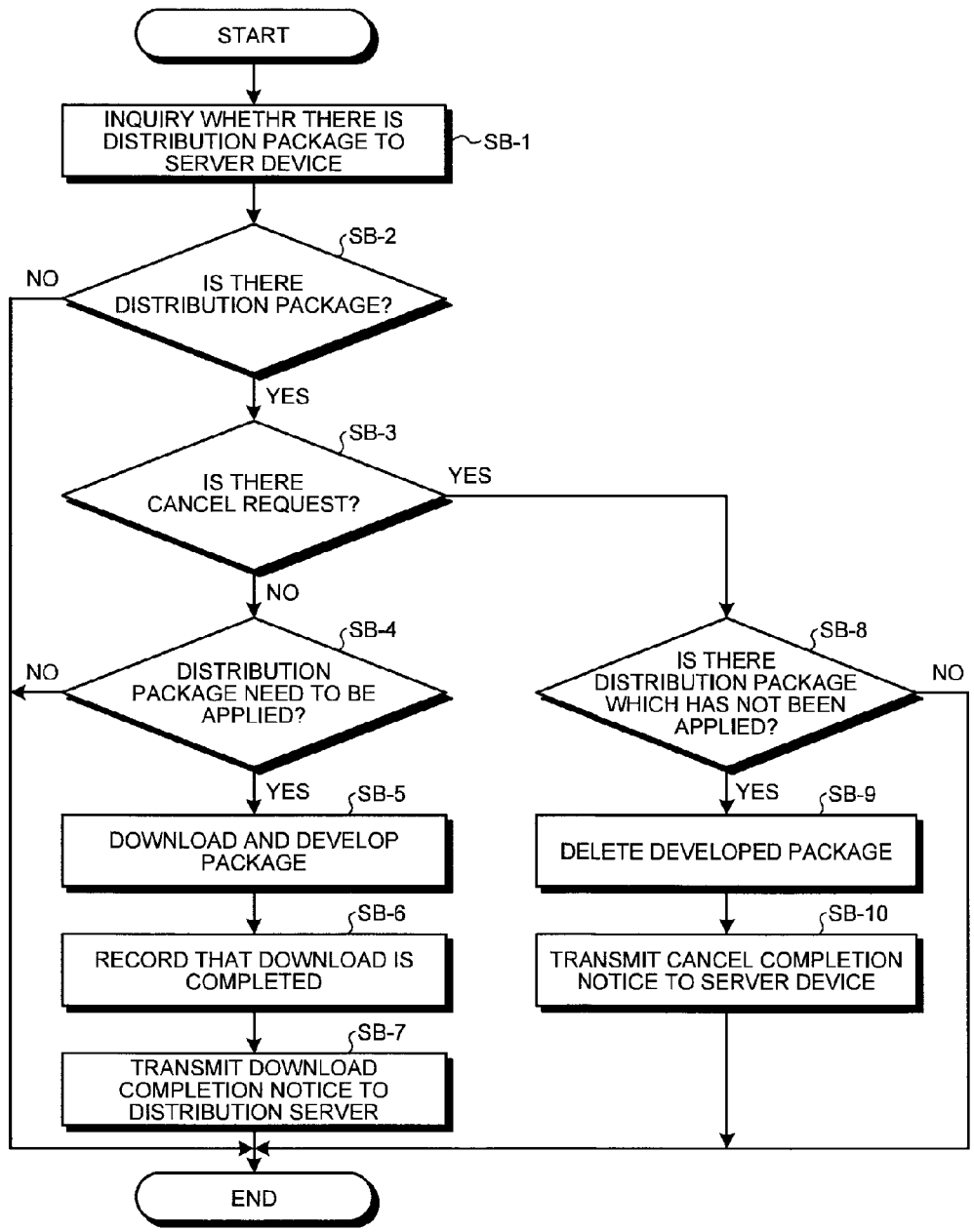

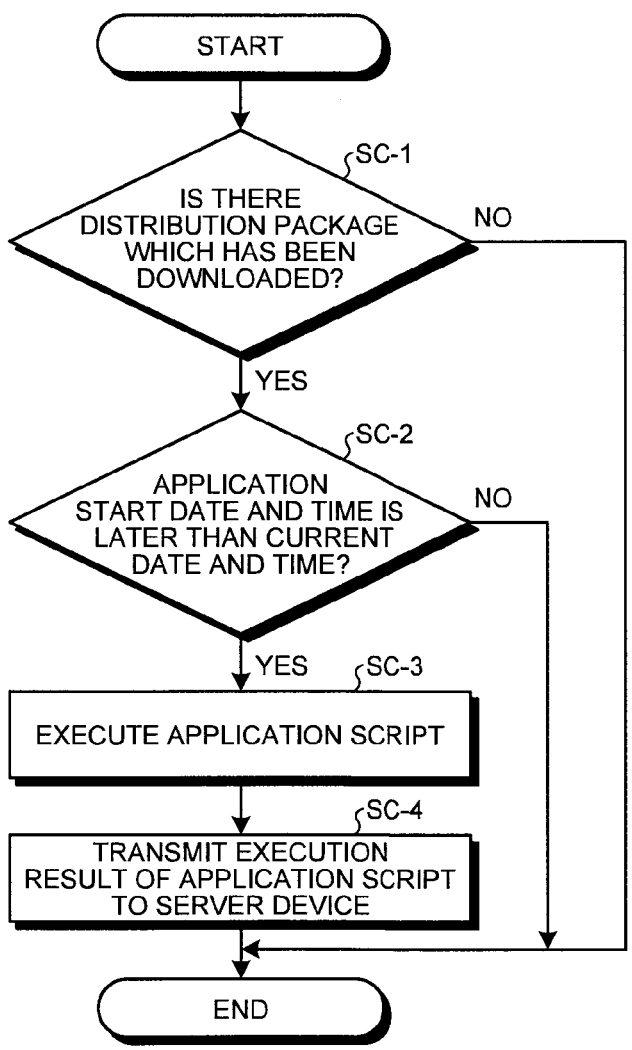

FIG.8

```
# LINE WITH # AT LINE HEAD IS COMMENT
# CHANGE NAME new1.dll TO sample1.dll AND MOVE
M, "C:\term\Update\new1.dll", "C:\lolib\sample1.dll"
# CHANGE NAME new2.dll TO sample2.dll AND MOVE
M, "C:\term\Update\new2.dll", "C:\lolib\sample2.dll"
```

FIG.9

```
# MOVE delfiles.exe, setup.exe, AND setup.dll TO tmp DIRECTORY
M, "C:\term\Update\delfile.exe", "C:\tmp\delfile.exe"
M, "C:\term\Update\setup.exe", "C:\tmp\setup.exe"
M, "C:\term\Update\setup.dll", "C:\tmp\setup.dll"
# SET PARAMETER AND EXECUTE setup.exe
E, "C:\tmp\setup.exe -s",
# AFTER EXECUTING delfile.exe, EXECUTE REBOOT
B, "C:\tmp\delfiles.exe",
```

FIG.10

```
# DISPLACEMENT OF SYSTEM FILE. ACTURAL DISPLACEMENT IS EXECUTED IN NEXT
  REBOOT PERIOD.
E, "C:\term\Update\PmMoveFile.exe C:\term\Update\sample.bat,C:\sys\Bin\sample.bat",
# AFTER PROCESSING, EXECUTE REBOOT
B, "C:\term\Update\PmMoveFile.exe C:\term\Update\setting.xml,C:\sys\set\setting.xml",
```

FIG.11

```
# MOVE SCHEDULE SETTING FILE
M, "C:\term\Update\schedule.xml", "C:\schlib\schedule.xml"
# EXECUTE setschedule.exe, AND SET NEW SCHEDULE
E, "C:\schlib\setschedule.exe C:\schlib\schedule.xml",
```

DELIVERY SYSTEM, SERVER DEVICE, TERMINAL DEVICE, AND DELIVERY METHOD

RELATED APPLICATIONS

The present application is a continuation of and claims priority from International Application PCT/JP2009/062694, filed Jul. 13, 2009, the disclosure of which is hereby incorporated by reference herein in its entirety.

BACKGROUND OF THE INVENTION

1. Field of the Invention

The present invention relates to a delivery system, a server device, a terminal device, and a delivery method.

2. Description of Related Art

Conventionally, as a method for distributing a software resource such as programs, contents, and settings, there are a push type method in which a server transmits the software resource and a pull type method (download type method) in which a terminal retrieves the software resource.

In the download type distribution method, there are advantages that the server does not need to know a power on/off state of the terminal and the terminal can retrieve the software resource at a convenient timing. This method is preferred when applying a latest modification program at all times, or when the terminal determines whether the modification program needs to be applied, and the like.

Japanese patent application laid-open No. 11-306000 relates to a method for keeping software installed in a medical device connected to a network at its latest version, and the Japanese patent application laid-open No. 11-306000 discloses a method in which the version of the software held in the server is compared with the version of the software installed in the device, and if the server has newer software, the software is downloaded, so that the software installed in the device is kept at its latest version.

Japanese patent application laid-open No. 2003-5991 discloses a system in which, to easily perform an update of firmware included in an electronic device, at a predetermined timing such as when the electronic device transmits an inquiry or when new firmware is added, a server notices the terminal of the version of the firmware held in the server, and the terminal downloads firmware from the server and installs the firmware when the terminal finds that the version is newer than the version of the firmware included in the terminal on the basis of the notice.

However, the conventional download type distribution method has a problem that whether the resource released from the server is applied depends on an operation in the terminal because the resource is applied at a timing such as when the terminal is started or when an update operation is performed in the terminal. In other words, the conventional method has a problem that it is difficult for the server to control the date and time of the update or check the distribution status, and a normal operation of the terminal is adversely affected because the resource is downloaded and applied when the terminal is in use.

For example, the conventional distribution methods described in the Japanese patent application laid-open No. 11-306000, the Japanese patent application laid-open No. 2003-5991, and the like, cause a problem that, when the size of the resource to be downloaded is large, a load due to the download is added to the network, and a normal operation of the terminal is affected. Therefore, although it can be considered that the download is performed in a time period when the terminal is not in a normal operation, such as a non-business time period, such a time period is usually late in the night or the like, and it is difficult to perform the download operation manually in the server or the terminal. On the other hand, although it can be considered that the download operation is performed automatically by, for example, changing the start time of the terminal using a scheduler which can control power supply of the terminal, a problem that a large amount of effort may be required to set the schedulers of all the terminals still remains.

In conventional distribution methods, although a method in which, when distributing resources, downloads are not allowed before a specific date and time is employed, this method has a problem that a long time is required until the resources are applied to all the terminals because the downloads concentrate at the specific date and time from many terminals at the same time and increase the load of the network.

SUMMARY OF THE INVENTION

It is an object of the present invention to at least partially solve the problems in the conventional technology.

A delivery system according to one aspect of the present invention includes a server device including a storage unit and a control unit, and a terminal device including a storage unit and a control unit, wherein the server device and the terminal device are communicably connected to each other via a network. The storage unit of the server device includes a distribution package storage unit that stores a distribution package including a resource to be applied to the terminal device, an application script to apply the resource, and application start timing information related to an application start timing when the application script is executed. The control unit of the terminal device includes an acquisition request transmitting unit that transmits an acquisition request of the distribution package to the server device, a distribution package acquiring unit that receives the distribution package from the server device and stores the distribution package into the storage unit, an application start determining unit that determines whether current date and time is the application start timing based on the application start timing information included in the distribution package stored in the storage unit, and a resource applying unit that applies the resource by executing the application script when the current date and time is determined to be the application start timing by the application start determining unit. The control unit of the server device includes an acquisition request receiving unit that receives the acquisition request of the distribution package from the terminal device, and a distribution package transmitting unit that transmits the distribution package stored in the distribution package storage unit to the terminal device when the acquisition request is received by the acquisition request receiving unit.

A server device according to another aspect of the present invention is communicably connected to a terminal device via a network, and includes a storage unit and a control unit. The storage unit includes a distribution package storage unit that stores a distribution package including a resource to be applied to the terminal device, an application script to apply the resource, and application start timing information related to an application start timing when the application script is executed. The control unit includes an acquisition request receiving unit that receives an acquisition request of the distribution package transmitted from the terminal device, and a distribution package transmitting unit that transmits the distribution package stored in the distribution package storage unit to the terminal device when the acquisition request is received by the acquisition request receiving unit, to apply the resource by executing the application script when current date and time is determined to be the application start timing based on the application start timing information included in the distribution package.

A terminal device according to still another aspect of the present invention is communicably connected to a server device including a storage unit via a network, and includes a storage unit and a control unit. The storage unit of the server device includes a distribution package storage unit that stores a distribution package including a resource to be applied to the terminal device, an application script to apply the resource, and application start timing information related to an application start timing when the application script is executed. The control unit includes an acquisition request transmitting unit that transmits an acquisition request of the distribution package to the server device, a distribution package acquiring unit that receives the distribution package transmitted from the server device based on the acquisition request and stores the distribution package into the storage unit, an application start determining unit that determines whether current date and time is the application start timing based on the application start timing information included in the distribution package stored in the storage unit, and a resource applying unit that applies the resource by executing the application script when the current date and time is determined to be the application start timing by the application start determining unit.

A distribution method according to still another aspect of the present invention is executed by a distribution system including a server device having a storage unit and a control unit, and a terminal device having a storage unit and a control unit, wherein the server device and the terminal device are communicably connected to each other via a network. The storage unit of the server device includes a distribution package storage unit that stores a distribution package including a resource to be applied to the terminal device, an application script to apply the resource, and application start timing information related to an application start timing when the application script is executed. The method includes an acquisition request transmitting step of transmitting an acquisition request of the distribution package to the server device, an acquisition request receiving step of receiving the acquisition request of the distribution package from the terminal device, a distribution package transmitting step of transmitting the distribution package stored in the distribution package storage unit to the terminal device when the acquisition request is received at the acquisition request receiving step, a distribution package acquiring step of receiving the distribution package from the server device and storing the distribution package into the storage unit, an application start determining step of determining whether current date and time is the application start timing based on the application start timing information included in the distribution package stored in the storage unit, and a resource applying step of applying the resource by executing the application script when the current date and time is determined to be the application start timing at the application start determining step. The steps are executed by the control unit.

A distribution method according to still another aspect of the present invention is executed by a server device communicably connected to a terminal device via a network, including a storage unit and a control unit. The storage unit includes a distribution package storage unit that stores a distribution package including a resource to be applied to the terminal device, an application script to apply the resource, and application start timing information related to an application start timing when the application script is executed. The method includes an acquisition request receiving step of receiving an acquisition request of the distribution package transmitted from the terminal device, and a distribution package transmitting step of transmitting the distribution package stored in the distribution package storage unit to the terminal device when the acquisition request is received at the acquisition request receiving step, to apply the resource by executing the application script when current date and time is determined to be the application start timing based on the application start timing information included in the distribution package. The steps are executed by the control unit.

A distribution method according to still another aspect of the present invention is executed by a terminal device communicably connected to a server device including a storage unit via a network, including a storage unit and a control unit. The storage unit of the server device includes a distribution package storage unit that stores a distribution package including a resource to be applied to the terminal device, an application script to apply the resource, and application start timing information related to an application start timing when the application script is executed. The method includes an acquisition request transmitting step of transmitting an acquisition request of the distribution package to the server device, a distribution package acquiring step of receiving the distribution package transmitted from the server device based on the acquisition request and storing the distribution package into the storage unit, an application start determining step of determining whether current date and time is the application start timing based on the application start timing information included in the distribution package stored in the storage unit, and a resource applying step of applying the resource by executing the application script when the current date and time is determined to be the application start timing at the application start determining step. The steps are executed by the control unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram showing an example of framework of a distribution package stored in a distribution package storage file 206a;

FIG. 4 is a diagram showing an example of target terminal information stored in a target terminal file 206b;

FIG. 6 is a flow chart showing an example of distribution package acquiring process of the present delivery system in the present embodiment;

FIG. 7 is a flow chart showing an example of applying process of the present delivery system in the present embodiment;

FIG. 8 is a diagram showing an example of an application script;

FIG. 9 is a diagram showing an example of the application script;

FIG. 10 is a diagram showing an example of the application script; and

FIG. 11 is a diagram showing an example of the application script defined a function that changes an automatic operation schedule.

DETAILED DESCRIPTION OF THE PREFERRED EMBODIMENTS

Hereinafter, the embodiment of the delivery system, the server device, the terminal device, the delivery method and the program, recording medium of the present invention will be described in detail based on the figure. In the meantime, the present embodiment does not limit the present invention to any particular one.

Outline of the Present Invention

Hereinafter, the outline of the present invention will be described with reference to FIG. 1 and after that, the framework, processing and the like of the present invention will be described in detail.

Schematically, the present invention has following basic features. That is, the terminal device of the present invention includes at least a storage unit and a control unit. For example, the terminal device is a kiosk terminal device, a scanner device, or a printer device and the like. The server device of the present invention includes at least a storage unit and a control unit. The storage unit of the server device stores a distribution package including at least a resource to be applied to the terminal device, an application script to apply the resource, and application start timing information related to an application start timing when the application script is executed. The terminal device and the server device are communicably connected to each other via network.

The "resource" included in the distribution package is an information resource to be applied to the terminal, and for example includes a software program, an installer thereof, contents, parameters and data used for various settings, and the like. The "application" means applying the resource to the terminal device, and for example, means installing the software program, exchanging the contents, replacing the parameters and data used for various settings, and the like. The "application script" is a program for applying the resource or the like (for example, file copy processing, installer start command, and the like), and may include a setting condition of various parameters or the like. The "application start timing" is various conditions for executing the application script, and for example, includes a start date and time from which the application script can be executed (for example, the application script is executed if the current date and time is later than the start date and time), a time period, other conditions (for example, conditions such as x days after the download and x days after the distribution package is applied), and the like.

Figure 1:
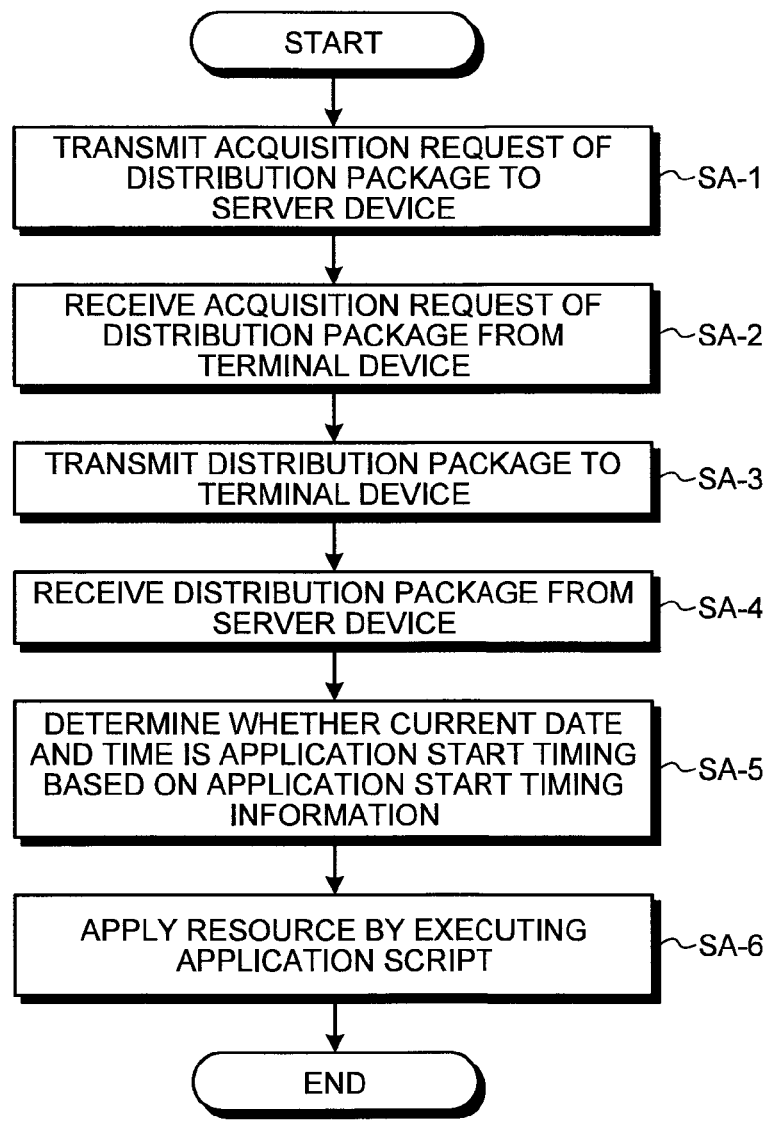
FIG. 1 is a flow chart showing a basic principle of the present invention.

As shown in FIG. 1, the terminal device transmits an acquisition request of the distribution package to the server device (step SA-1). Here, the terminal device may first inquire of the server device about the distribution package to be a distribution target, and may transmit the acquisition request to the server device based on answer information when receiving the answer information regarding the distribution package to be a distribution target from the server device. In the meantime, timing when the terminal device inquires may be controlled at the server device side by transmitting a distribution notice from the server device to the terminal device of the distribution target.

The server device receives the acquisition request of the distribution package from the terminal device (step SA-2).

The server device transmits the distribution package stored in the storage unit to the terminal device when the acquisition request is received (step SA-3).

The terminal device receives the distribution package and stores the distribution package into the storage unit (step SA-4). Here, the terminal device may associate a receiving result with the name and the version of the distribution package and may transmit the receiving result to the server device. The terminal device may inquire of the server device about the distribution package to be an application target, and may delete the distribution package that is not the application target from the storage unit when receiving a cancel request regarding the distribution package that is not the application target. In the meantime, timing when the terminal device inquires may be controlled at the server device side by transmitting a distribution notice from the server device to the terminal device that is not the application target.

The terminal device determines whether current date and time is the application start timing based on the application start timing information included in the distribution package stored in the storage unit (step SA-5).

The terminal device applies the resource by executing the application script included in the distribution package stored in the storage unit when the current date and time is determined to be the application start timing (step SA-6). Here, the terminal device may associate an application result with the name and the version of the distribution package and may transmit the application result to the server device.

Here, the distribution package may be constructed to further include distribution type information regarding whether download time period limitation is enabled or disabled. In this case, the server device may further store download time period information regarding a downloadable time period and a non-downloadable time period, and may control not to allow download with respect to the acquisition request or the inquiry information when the download time period limitation is enabled based on the distribution type information included in the distribution package and current date and time is in the non-downloadable time period based on the download time period information.

Framework of the Delivery System

Figure 2:
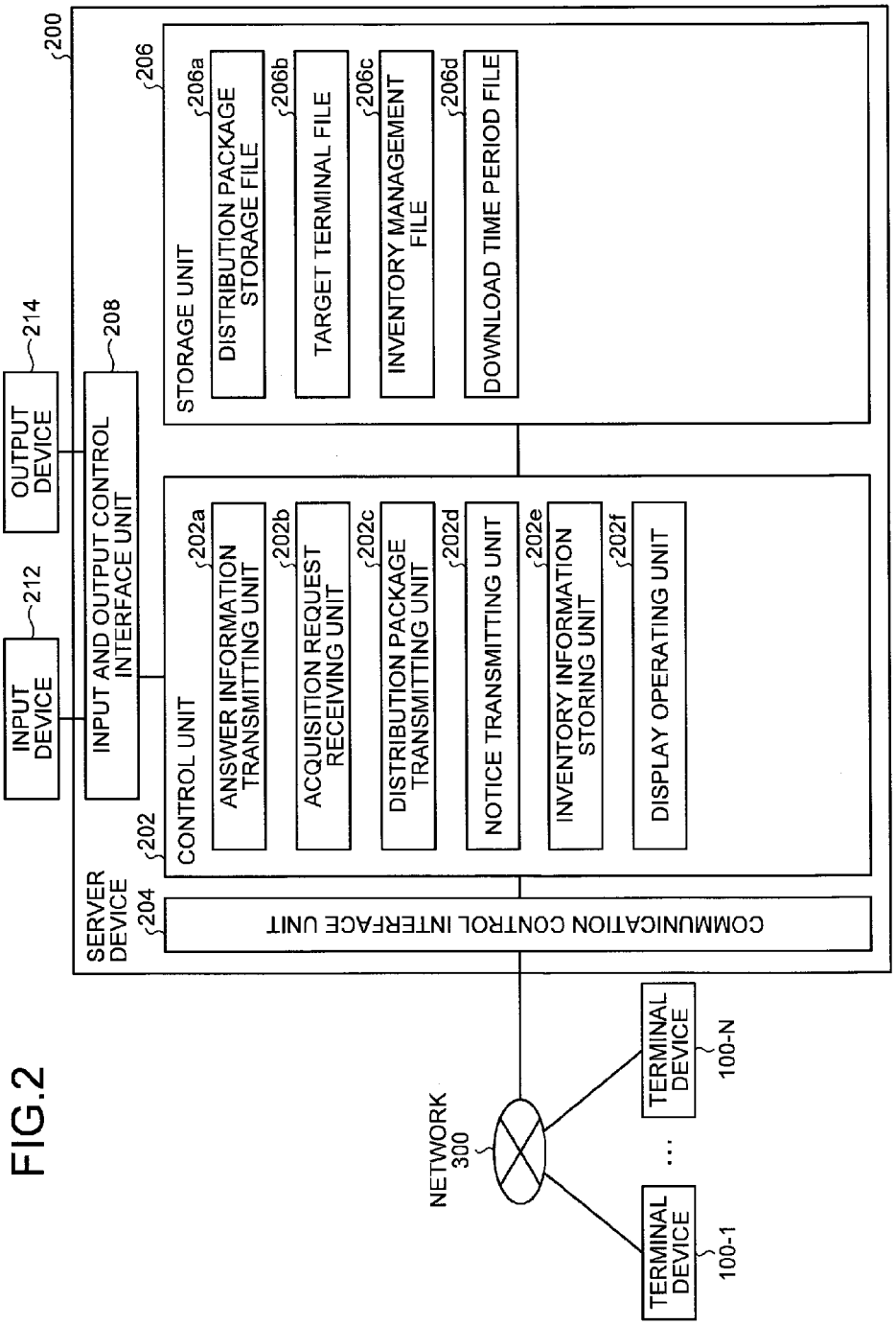
FIG. 2 is a block diagram showing an example of framework of the server device 200 in the present delivery system to which the present invention is applied.

The framework of the delivery system will be described with reference to FIGS. 2 to 5. FIG. 2 indicates only portions related to the present invention in the framework conceptually. The delivery system is schematically constructed to be capable of being connected to a plurality of terminal devices 100-1 to 100-N and a server device 200 through network 300.

In FIG. 2, network 300 has a function that connects the terminal device 100 and the server device 200 each other. For example, network 300 is an Ethernet (registered trademark), Fiber-Distributed Data Interface (FDDI), Local Area Network (LAN), Wide Area Network (WAN) or the like.

In FIG. 2, the server device 200 is schematically constructed to include a control unit 202, a communication control interface unit 204, an input/output control interface unit 208, and a storage unit 206. For example, the server device 200 can be constructed by a general server device. Here, the control unit 202 is a CPU or the like that make integrated control of the whole server device 200. The communication control interface unit 204 is an interface connected to a communication device (not shown) such as a router connected to a communication line or the like. The input/output control interface unit 208 is an interface connected to an input device 212 and an output device 214. The storage unit 206 is a device that stores such as various databases and various tables. Any of these each part of the server device 200 is communicably connected through any communication path. The server device 200 is communicably connected to network 300 through the communication device such as a router and a wired or wireless connection line such as a dedicated line.

The various databases and the various tables (distribution package storage file 206a to download time period file 206d) stored in the storage unit 206 is a storage unit such as a hard disk device and a fixed disk device. For example, the storage unit 206 stores various programs, various tables, various files, various databases, various web pages for download, and the like used in various processes.

Figure 3:
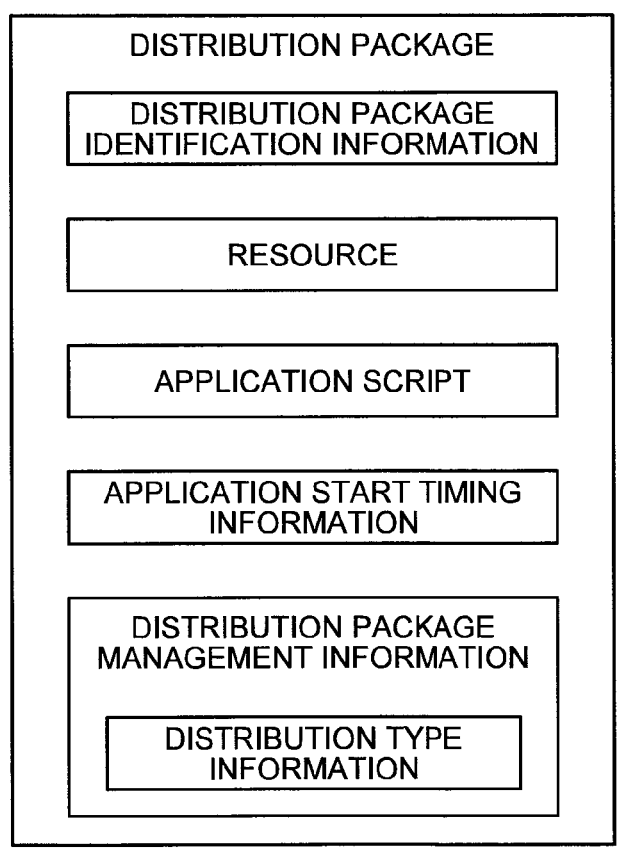

Of the constituent elements of the storage unit 206, the distribution package storage file 206a stores a distribution package. As shown in FIG. 3, as an example, the distribution package stored in the distribution package storage file 206a is constructed to include distribution package identification information, a resource, an application script, application start timing information, distribution package management information. Here, the distribution package identification information is information that defines a name and a version and the like of the distribution package. For example, the distribution package identification information is the identification information such as "P0001". The resource is an information resource to be applied to the terminal, for example includes a software program, an installer thereof, contents, parameters and data used for various settings, and the like. The application script is a program for applying the resource or the like (for example, file copy processing, installer start command, and the like), and may include a setting condition of various parameters or the like. The application start timing information is information that defines various conditions for executing the application script. For example, the application start timing information is information that defines a date and time such as "2010/01/01 12:00", and other conditions. The distribution package management information is information for managing the distribution package, and for example may include distribution type information regarding whether download time period limitation is enabled or disabled. In the meantime, the distribution package storage file 206a may store identification information (URL or the like) for downloading the distribution package, associated with the distribution package.

Referring back to FIG. 2, the target terminal file 206b stores target terminal information that specifies the terminal device 100 to be the distribution target or the application target of the distribution package stored in the distribution package storage file 206a from a plurality of terminal devices 100-1 to 100-N. For example, the target terminal information stored in the target terminal file 206b is information that stores identification information of the distribution package to be the distribution target or the application target, associated with the terminal information that uniquely specifies the terminal device 100. In the meantime, the target terminal file 206b may store the terminal information that specifies the terminal device that is not the application target of the distribution target. As shown in FIG. 4, as an example, the target terminal file 206b relates and stores the target terminal information (for example, "T001, T002, T003") for identifying the terminal device to be a distribution target, the identification information of the distribution package to be distributed (for example, "P001"), and information indicating cancel is required or not (for example, flag information when not to be applied) for each terminal group (for example, for "group 1"). This example case shows that the terminal device 100-1 specified by "T001" belongs to "group 1", the distribution package to be distributed to the terminal devices 100-1 to 100-3 belonging to "group 1" is "P001", and the application is not cancelled.

Referring back to FIG. 2, the download time period file 206d stores download time period information regarding a downloadable time period and a non-downloadable time period. For example, the download time period information stored in the download time period file 206d is information in which a time period such as, for example, "7:00 am to 9:00 pm" is defined as a time period when the download cannot be performed, and the download time period information is specified via the input device 212 avoiding the normal operation time period of the terminal so that the download processing does not affect the normal operation of the terminal.

In FIG. 2, the communication control interface unit 204 controls a communication between the server device 200 and the network 300 (or the communication device such as a router). For example, the communication control interface unit 204 is LAN interface. That is, the communication control interface unit 204 has a function that communicates with the terminal device 100 through the communication line.

In FIG. 2, the input/output control interface unit 208 controls the input device 212 and the output device 214. Here, a monitor (including a home television) and a speaker can be used as the output device 214 (in the meantime, hereinafter the output device 214 may be described as the monitor). A keyboard, a mouse, a microphone can be used as the input device 212.

In FIG. 2, the control unit 202 has an internal memory to store a control program such as an Operating System (OS), a program that defines various procedures and the like, and required data. According to the programs and the like, the control unit 202 performs information processing for executing various processes. The control unit 202 functionally and conceptually is constructed to include an answer information transmitting unit 202a, an acquisition request receiving unit 202b, a distribution package transmitting unit 202c, notice transmitting unit 202d, an inventory information storing unit 202e, and a display operating unit 202f.

Of these components, the answer information transmitting unit 202a transmits answer information about the distribution package to be the distribution target or the application target to the terminal device 100 based on the target terminal information stored in the target terminal file 206b when receiving the inquiry information from the terminal device 100. The answer information may be, for example, identification information (URL or the like) for downloading the distribution package. In this case, the answer information transmitting unit 202a transmits the identification information to only the terminal device 100 to be the distribution target. Here, the answer information transmitting unit 202a may transmit a cancel request of the distribution package that is not the application target as the answer information based on the target terminal information stored in the target terminal file 206b when receiving the inquiry information. For example, as shown in FIG. 4 described above, when the information indicating that cancel is required is stored in the target terminal file 206b with respect to the target terminal information specifying the terminal device 100 which has transmitted the inquiry information, the answer information transmitting unit 202a may transmit a cancel request to the terminal device 100. The answer information transmitting unit 202a may be configured to not to transmit the answer information and may transmit the answer information that is not to allow download to the terminal device 100, with respect to the received inquiry information when the download time period limitation is enabled based on the distribution type information included in the distribution package stored in the distribution package storage file 206a and current date and time is in the non-downloadable time period based on the download time period information stored in the download time period file 206d.

The acquisition request receiving unit 202b receives the acquisition request of the distribution package from the terminal device 100.

The distribution package transmitting unit 202c transmits the distribution package stored in the distribution package storage file 206a to the terminal device 100 when the acquisition request is received by the acquisition request receiving unit 202b sent from the terminal device 100. The distribution package transmitting unit 202c may not transmit the distribution package to the terminal device 100 and may control not to allow download, with respect to the acquisition request received by the acquisition request receiving unit 202b when the download time period limitation is enabled based on the distribution type information included in the distribution package stored in the distribution package storage file 206a and current date and time is in the non-downloadable time period based on the download time period information stored in the download time period file 206d.

The notice transmitting unit 202d transmits a distribution notice to the terminal device 100 that is the distribution target and transmits a cancel notice to the terminal device 100 that is not the application target on the basis of the target terminal information stored in the target terminal file 206b. For example, as shown in FIG. 4 described above, on the basis of the target terminal information specifying the terminal device 100 which has transmitted the inquiry information, when the terminal device 100 is set as a distribution target, the notice transmitting unit 202d transmits a distribution notice to the terminal device 100, and on the other hand, when the information indicating that cancel is required is set, the notice transmitting unit 202d transmits a cancel notice to the terminal device 100.

The inventory information storing unit 202e receives the inventory information from the terminal device 100 and stores the inventory information into the inventory management file 206c. The details of the inventory information will be explained in detail in the framework of the terminal device 100 below (inventory information transmitting unit 102g).

The display operating unit 202f operates an input control or a display control of various data. For example, the display operating unit 202f may control the output device 214 via the input/output control interface unit 208 so that the inventory information stored in the inventory management file 206c is displayed. The display operating unit 202f may control the input device 212 and the output device 214 via the input/output control interface 208 to have a user input the target terminal information, and store the input target terminal information into the target terminal file 206b. The display operating unit 202f may have the user input an update resource or the like, and store the distribution package including the update resource or the like into the distribution package storage file 206a. The display operating unit 202f may control the input device 212 and the output device 214 via the input/output control interface 208 so that the operation screen is displayed to realize a GUI (Graphical User Interface).

Figure 5:
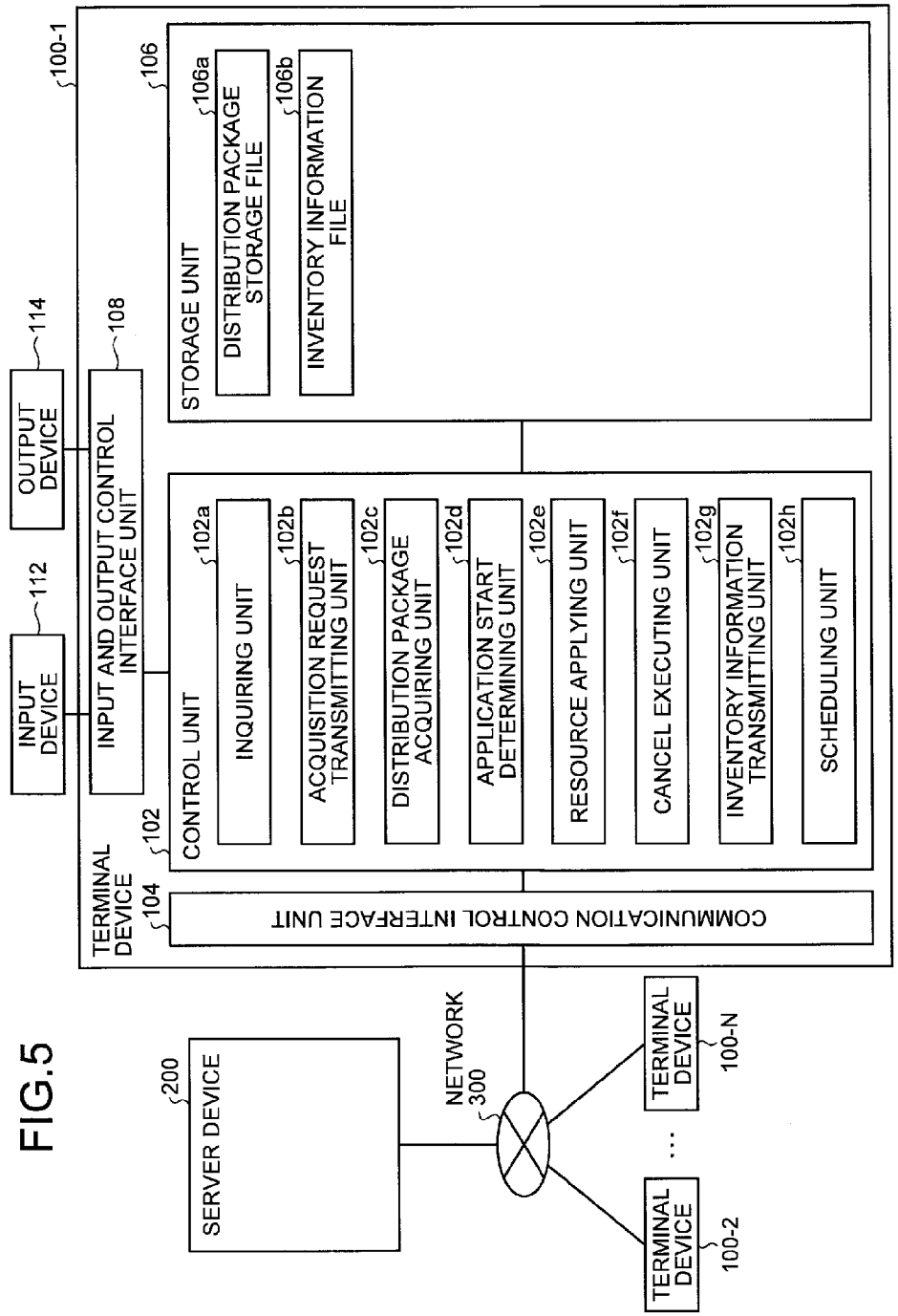
FIG. 5 is a block diagram showing an example of framework of a terminal device 100 in the present delivery system to which the present invention is applied.

Next, an example of a framework of the terminal device 100 in the present delivery system will be explained. FIG. 5 indicates only portions related to the present invention in the framework conceptually. In the meantime, FIG. 5 shows the framework of the terminal device 100-1 out of the terminal devices 100-1 to 100-N, however, the framework of the terminal device 100-1 is same as that of other terminal device 100-2 to 100-N.

In FIG. 5, the terminal device 100 is schematically constructed to include a control unit 102, a communication control interface unit 104, an input/output control interface unit 108, and a storage unit 106. For example, the terminal device 100 is a personal computer (PC), a kiosk terminal device (Kiosk), a scanner device, a printer device and the like. Here, the control unit 102 is a CPU or the like that make integrated control of the whole terminal device 100. The communication control interface unit 104 is an interface connected to a communication device (not shown) such as a router connected to a communication line or the like. The input/output control interface unit 108 is an interface connected to an input device 112 and an output device 114. The storage unit 106 is a device that stores such as various databases and various tables. Any of these each part of the terminal device 100 is communicably connected through any communication path. The terminal device 100 is communicably connected to network 300 through the communication device such as a router and a wired or wireless connection line such as a dedicated line.

The various databases and the various tables (distribution package storage file 106a and inventory information file 106b) stored in the storage unit 106 is a storage unit such as a fixed disk device. For example, the storage unit 106 stores various programs, various tables, various files, various databases, and the like used in various processes.

Of the constituent elements of the storage unit 106, the distribution package storage file 106a stores a received (downloaded) distribution package.

The inventory information file 106b stores an inventory information. This inventory information stored in the inventory information file 106b includes such as a received result that is received by a distribution package acquiring unit 102c to be hereinafter described, and a applied result that is applied by a resource applying unit 102e to be hereinafter described, associated with the identification information (such as name or version or the like) of the distribution package.

In FIG. 5, the communication control interface unit 104 controls a communication between the terminal device 100 and the network 300 (or the communication device such as a router). For example, the communication control interface unit 104 is LAN interface. That is, the communication control interface unit 104 has a function that communicates with other terminal through the communication line.

In FIG. 5, the input/output control interface unit 108 controls the input device 112 and the output device 114. Here, a monitor (including a home television) and a speaker can be used as the output device 114 (in the meantime, hereinafter the output device 114 may be described as the monitor). A keyboard, a mouse, a microphone can be used as the input device 112.

In FIG. 5, the control unit 102 has an internal memory to store a control program such as an Operating System (OS), a program that defines various procedures and the like, and required data. According to the programs and the like, the control unit 102 performs information processing for executing various processes. The control unit 102 functionally and conceptually is constructed to include an inquiring unit 102a, an acquisition request transmitting unit 102b, a distribution package acquiring unit 102c, an application start determining unit 102d, a resource applying unit 102e, a cancel executing unit 102f, an inventory information transmitting unit 102g, and a scheduling unit 102h.

Of these components, the inquiring unit 102a transmits inquiry information to the server device 200 for inquiring about the distribution package to be a distribution target or an application target. Here, the inquiring unit 102*a* may transmit the inquiry information to the server device 200 when receiving the distribution notice or the cancel notice from the server device 200. In the mean time, the inquiry information may include terminal information that uniquely specifies the terminal device 100.

The acquisition request transmitting unit 102*b* transmits an acquisition request of the distribution package to the server device 200. Here, the acquisition request transmitting unit 102*b* may transmit the acquisition request to the server device 200 based on the answer information when receiving the answer information (for example, the identification information for download such as URL or the like) from the server device 200. In the meantime, the acquisition request may include terminal information that uniquely specifies the terminal device 100.

The distribution package acquiring unit 102*c* receives the distribution package from the server device 200 and stores the distribution package into the distribution package storage file 106*a*. Here, the distribution package acquiring unit 102*c* may develop the received distribution package into pieces of information such as the distribution package identification information, the resource, the application script, the application start timing information, the distribution package management information and the like, and may store the information into the distribution package storage file 106*a*.

The application start determining unit 102*d* determines whether current date and time is the application start timing based on the application start timing information included in the distribution package stored in the distribution package storage file 106*a*.

The resource applying unit 102*e* applies the resource by executing the application script when the current date and time is determined to be the application start timing by the application start determining unit 102*d*.

The cancel executing unit 102*f* deletes the distribution package that is received by the distribution package acquiring unit 102*c* and is not applied by the resource applying unit 102*e* from the distribution package storage file 106*a* when receiving the cancel request from the server device 200.

The inventory information transmitting unit 102*g* creates the inventory information in which any one of a receiving result by the distribution package acquiring unit 102*c* and an application result by the resource applying unit 102*e* or both are associated with the name and the version of the identification information of the distribution package and stored to the distribution package storage file 106*a* and, transmits the inventory information to the server device 200. In the meantime, the inventory information may include terminal information that uniquely specifies the terminal device 100.

The scheduling unit 102*h* controls to transmit the acquisition request by the acquisition request transmitting unit 102*b* or the inquiry information by the inquiring unit 102*a* to the server device 200 when the current date and time is in a downloadable time period. In the meantime, the scheduling unit 102*h* may be configured to function in conjunction with an internal clock even when a main power supply of the terminal device 100 is off. Specifically, if the main power supply of the terminal device 100 is off, the scheduling unit 102*h* may automatically start the terminal device 100 when the internal clock indicates that the current date and time is in a downloadable time period, and control the inquiring unit 102*a* or the acquisition request transmitting unit 102*b* so that the acquisition request or the inquiry information is transmitted to the server device 200. The downloadable time period controlled by the scheduling unit 102*h* may be configured to be able be changed by the resource, the application script, or the like in the distribution package received from the server device 200.

Process of the Delivery System

An example of the process of the present delivery system according to the embodiment thus configured is explained in detail with reference to FIGS. 6 to 11.

Distribution Package Acquiring Process

Details of the distribution package acquiring process will be explained below with reference to FIGS. 6 to 10.

First, the terminal device 100 transmits the inquiry information for inquiring whether there is a distribution package to be distributed or applied to the server device 200 by the processing of the inquiring unit 102*a* (step SB-1). Here, the inquiring unit 102*a* may transmit the inquiry information at a timing related to a certain terminal operation such as when the terminal is started, a logout operation is performed, or the terminal is moved into a hibernation state, and also the inquiring unit 102*a* may transmit the inquiry information when receiving the distribution notice or the cancel notice from the server device 200.

After receiving the inquiry information from the terminal device 100, when the server device 200 determines that there is a distribution package to be distributed or applied based on the target terminal information stored in the target terminal file 206*b*, the server device 200 transmits the answer information such as the identification information (URL or the like) or the like for downloading the distribution package to the terminal device 100 by the processing of the answer information transmitting unit 202*a*. For example, the answer information includes information of the presence or absence of the distribution target, the presence or absence of the application target (application cancel is required or not), and the like, associated to the identification information of the distribution package.

The terminal device 100 determines whether there is a target distribution package based on the received answer information by the processing of the acquisition request transmitting unit 102*b* (step SB-2). The acquisition request transmitting unit 102*b* may determine that there is not a distribution package of the distribution target when not receiving the answer information.

When determining that there is a distribution package to be distributed (step SB-2, Yes), the terminal device 100 determines whether there is a cancel request by the processing of the acquisition request transmitting unit 102*b* (step SB-3). For example, the acquisition request transmitting unit 102*b* may determine that there is the cancel request when the answer information received in step SB-2 includes the information indicating that cancel is required. When determining that there is not a distribution package to be distributed (step SB-2, No), the terminal device 100 ends the process.

When determining that there is not a cancel request (step SB-3, No), the terminal device 100 determines whether the distribution package needs to be applied by the processing of the acquisition request transmitting unit 102*b* (step SB-4). For example, the acquisition request transmitting unit 102*b* may determine that the distribution package does not need to be applied when the distribution package has already been downloaded and applied, may determine that the distribution package does not need to be applied when a distribution package which has the same name and the same or later version has already been applied, may determine whether the distribution package needs to be applied based on the information indicating the distribution package needs to be applied or not in the answer information received in step SB-2, or may determine that the distribution package does not need to be applied by any other method.

When determining that the distribution package needs be applied (step SB-4, Yes), the terminal device 100 transmits an acquisition request of the distribution package to be distributed (for example, a download request specifying identification information such as a URL or the like) to the server device 200 by the processing of the acquisition request transmitting unit 102*b*. When determining that the distribution package does not need be applied (step SB-4, No), the terminal device 100 ends the process.

The server device 200 acquires the distribution package corresponding to the received acquisition request from the distribution package storage file 206*a*, and transmits (transfers) the distribution package to the terminal device 100 by the processing of the distribution package transmitting unit 202*c*.

The terminal device 100 downloads the distribution package from the server device 200, and stores the distribution package into the distribution package storage file 106*a* by the processing of the distribution package acquiring unit 102*c* (step SB-5). The distribution package acquiring unit 102*c* may develop the downloaded distribution package into pieces of information such as the distribution package identification information, the resource, the application script, the application start timing information, and the like.

The terminal device 100 associates the download result by the distribution package acquiring unit 102*c* with the distribution package identification information (name, version, and the like), and stores the download result into the inventory information file 106*b* as the inventory information by the processing of the inventory information transmitting unit 102*g*, and thereafter the terminal device 100 records that the download is completed (step SB-6).

The terminal device 100 transmits the inventory information stored in the inventory information file 106*b* to the server device 200 by the processing of the inventory information transmitting unit 102*g*, and thereafter the terminal device 100 transmits a download completion notice (step SB-7). The server device 200 stores the received inventory information into the inventory management file 206*c* by the processing of the inventory information storing unit 202*e*, and manages the download status of the terminal device 100.

Here, in the above described step SB-3, when determining that there is a cancel request (step SB-3, Yes), the terminal device 100 determines whether the distribution package corresponding to the cancel request stored in the distribution package storage file 106*a* has not been applied by the processing of the cancel executing unit 102*f* (step SB-8). For example, the cancel executing unit 102*f* may determine whether the distribution package corresponding to the cancel request has been applied based on the inventory information stored in the inventory information file 106*b*.

When determining that the distribution package has not been applied (step SB-8, Yes), the terminal device 100 deletes the developed distribution package from the distribution package storage file 106*a* by the processing of the cancel executing unit 102*f* (step SB-9). When determining that the distribution package has been applied (step SB-8, No), the terminal device 100 ends the process.

The terminal device 100 makes inventory information in which the cancel result by the cancel executing unit 102*f* is associated with the distribution package identification information (name, version, and the like) and stored by the processing of the inventory information transmitting unit 102*g*, and thereafter transmits a cancel completion notice (step SB-10) by transmitting the inventory information to the server device 200.

Applying Process

Details of the applying process will be explained below with reference to FIG. 7.

As shown in FIG. 7, first, the terminal device 100 determines whether there is a distribution package which has been downloaded in the distribution package storage file 106*a* at a timing such as starting of the terminal device 100 by the processing of the application start determining unit 102*d* (step SC-1).

When determining that there is the distribution package which has been downloaded (step SC-1, Yes), the terminal device 100 determines whether the application start date and time based on the application start timing information included in the distribution package is later than the current date and time by the processing of the application start determining unit 102*d* (step SC-2). A condition or the like other than the application start date and time may be defined in the application start timing information, and the terminal device 100 may determine whether the current date and time is the application start timing based on the application start timing information. When determining that there is not a distribution package which has been downloaded (step SC-1, No), the terminal device 100 ends the process.

When determining that the application start date and time is later than the current date and time (step SC-2, Yes), the terminal device 100 executes the application script included in the distribution package by the processing of the resource applying unit 102*e*, and performs the application of the resource (step SC-3). When determining that the application start date and time is not later than the current date and time (step SC-2, No), the terminal device 100 ends the process. As shown as an example in FIG. 8, the application script defines processing to replace a program file. As shown as an example in FIG. 9, the application script defines processing to install software including installer. As shown as an example in FIG. 10, the application script defines processing to replace a system file which has already been executed at the time of startup.

Returning to FIG. 7 again, the terminal device 100 makes the inventory information in which the application result by the resource applying unit 102*e* is associated with the distribution package identification information (name, version, and the like) and stored by the processing of the inventory information transmitting unit 102*g*, and thereafter transmits an execution result of the application script (success of failure) to the server device 200 by transmitting the inventory information to the server device 200 (step SC-4). The server device 200 manages the application status of the terminal device 100 by storing the received inventory information into the inventory management file 206*c* by the processing of the inventory information storing unit 202*e*. The inventory information stored in the inventory management file 206*c* can be displayed on the output device 214 for reference of the user by the processing of the display operating unit 202*f* of the server device 200.

Distribution Notice Transmitting Process

Details of the distribution notice transmitting process in the present delivery system will be explained below.

First, the server device 200 controls the input device 212 and the output device 214 via the input/output control interface 208 to have the user input the target terminal information specifying the terminal device 100 to be a distribution target by the processing of the display operating unit 202*f*, and stores the input target terminal information into the target terminal file 206*b*.

The server device 200 transmits a distribution notice to the terminal device 100 which is a distribution target of the distribution package based on the target terminal information stored in the target terminal file 206*b* by the processing of the notice transmitting unit 202*d*.

When receiving the distribution notice, the terminal device 100 transmits inquiry information with respect to the target distribution package to the server device 200 by the processing of the inquiring unit 102*a* at a timing such as when the terminal is started, when a certain terminal operation is performed, or when the distribution notice is received.

The process hereinafter is the same as that of step SB-1 and the following steps. In this way, the server can notice the terminal that there is a distribution package to be distributed target without waiting for the inquiry from the terminal.

Cancelling Process

Details of the cancelling process in the present delivery system will be explained below.

First, the server device 200 controls the input device 212 and the output device 214 via the input/output control interface 208 by the processing of the display operating unit 202*f* to have the user input the target terminal information specifying the terminal device 100 on which the distribution or the application of the distribution package stored in the distribution package storage file 206*a* is cancelled, and stores the input target terminal information into the target terminal file 206*b*. For example, in the example shown in FIG. 4 described above, the display operating unit 202*f* performs a control to have the user input information indicating cancel is required or not in a cancel field.

The server device 200 transmits a cancel notice to the terminal device 100 which is a cancel target of the distribution package based on the target terminal information stored in the target terminal file 206*b* by the processing of the notice transmitting unit 202*d*. Although the cancel notice cannot be transmitted when the power of the terminal device 100 is turned off, the notice transmitting unit 202*d* may be configured to continue the processing even if the transmission fails.

When receiving the cancel notice, the terminal device 100 transmits inquiry information for inquiring whether there is the cancel request with respect to the target distribution package to the server device 200 by the processing of the inquiring unit 102*a* at a timing such as when the terminal is started, when a certain terminal operation is performed, or when the distribution notice is received.

When the server device 200 receives the inquiry information, if the distribution package to be distributed has already been downloaded to the terminal device 100 based on the target terminal file 206*b*, and if the distribution package is a cancel target based on the target terminal information stored in the target terminal file 206*b*, the server device 200 transmits a cancel request as the answer information to the terminal device 100 by the processing of the answer information transmitting unit 202*a*.

When receiving the cancel request from the server device 200, the terminal device 100 deletes the distribution package which has been received by the distribution package acquiring unit 102*c* and has not applied by the resource applying unit 102*e* from the distribution package storage file 106*a* by the processing of the cancel executing unit 102*f*.

The process hereinafter is the same as that of step SB-9 and the following steps. In this way, the server can notice the terminal that there is a distribution package to be cancelled without waiting for the inquiry from the terminal. Although, in the example described above, a case in which the inventory information transmitting unit 102*g* transmits the inventory information to the server device 200 at timings when the distribution package is acquired by the distribution package acquiring unit 102*c*, when the resource is applied by the resource applying unit 102*e*, and when the cancel is executed by the cancel executing unit 102*f* is explained, the example is not limited to this, and the inventory information in which various processing results are stored may be transmitted to the server device 200 at any timing such as the time of startup or at periodic intervals.

Scheduling Process

Details of the scheduling process in the present delivery system will be explained below. Here, for example, the scheduling unit 102*h* which performs scheduler processing includes either one of the following basic functions:

1. Function to start and stop the terminal device 100 according to a specified schedule
2. Function to perform registered processing at a specified date and time (even if the terminal device 100 has stopped (such as in a state of power-off), start the terminal device 100 and perform the processing)

First, the server device 200 controls the input device 212 and the output device 214 via the input/output control interface 208 to have the user specify a download inhibition time period with respect to the distribution package stored in the distribution package storage file 206*a* by the processing of the display operating unit 202*f*, and stores download time period information defining the download inhibition time period into the download time period file 206*d*. Whether the download inhibition is enabled or disabled is registered in the distribution type information in the distribution package storage file 206*a* when the distribution package is created. In other words, there are at least two types of the distribution type information in which the download inhibition is enabled or disabled. The download inhibition time period may be specified, for example, as "7:00 am to 9:00 pm" so as to avoid a normal operation time period of the terminal so that the download processing does not affect the normal operation of the terminal. Instead of the download inhibition time period, a download permission time period may be specified. A plurality of download inhibition time periods may be specified in 24 hours, and the download inhibition time period may be changed and specified for each month or day of the week.

After receiving the inquiry information from the terminal device 100, when the server device 200 determines that there is a distribution package to be distributed based on the target terminal information stored in the distribution package storage file 206*a*, the server device 200 transmits the identification information (URL or the like) for downloading the distribution package as the answer information to the terminal device 100 by the processing of the answer information transmitting unit 202*a*. At this time, the server device 200 controls not to transmit the answer information by the processing of the answer information transmitting unit 202*a* if the download inhibition in the distribution type information of the distribution package is enabled and the current time is in the download inhibition time period based on the download time period information stored in the download time period file 206*d*. In this case, the server device 200 may transmit a distribution package including the resource and the application script described below to the terminal device 100.

Either one of the functions described below can be included in the resource and the application script of the distribution package.

1. Function to call the scheduling unit 102*h* of the terminal device 100 and cause the scheduling unit 102*h* to change an automatic operation schedule.
2. Function to call the inquiring unit 102*a* of the terminal device 100 at a specific date and time and cause the scheduling unit 102*h* to control so that an inquiry whether there is a distribution package to be distributed is transmitted.

As shown in FIG. 11, when the application script is executed, a schedule specification file can be updated to set a new schedule.

In this way, the scheduling unit 102*h* performs schedule management so that inquiry information transmission processing or the like is performed at an appropriate timing by performing a start-up control and a power supply management of the terminal device 100, controlling the inquiring unit 102*a* at a specified date and time, and the like.

Another Embodiment

The embodiments of the present invention are explained above. However, the present invention may be executed in not only the embodiments but also various different embodiments without departing from the spirit and scope of the general inventive concept as defined by the appended claims and their equivalents.

For example, all the automatic processes explained in the present embodiment can be, entirely or in part, carried out manually. Similarly, all the manual processes explained in the present embodiment can be, entirely or in part, carried out automatically by a known method.

The process procedures, the control procedures, specific names, information including registration data of each process and parameters of search condition etc., display example, database structure mentioned in the description and drawings can be changed as required unless otherwise specified.

The constituent elements of the terminal device 100 and the server device 200 are merely conceptual and may not necessarily physically resemble the structures shown in the drawings. For instance, the apparatus need not necessarily have the structure that is illustrated.

For example, the process functions performed by the terminal device 100 and the server device 200, especially regarding each of the process functions executed at the control unit 102 and the control unit 202, can be entirely or partially realized by a central processing unit (CPU) or a computer program executed by the CPU or by a hardware using wired logic. The computer program, recorded on a recording medium, can be mechanically read by the terminal device 100 and the server device 200 as the situation demands. In other words, the computer program recorded on the recording medium can cause the storage unit 106 and the storage unit 206 such as read-only memory (ROM) or hard disk (HD) to work in coordination with the operating system (OS) to issue commands to the CPU and cause the CPU to perform various processes. The computer program is first loaded to the random access memory (RAM), and forms a control unit in collaboration with the CPU.

Alternatively, the computer program can be stored in any application program server connected to the terminal device 100 and the server device 200 via the network 300, and can be fully or partially loaded as the situation demands.

"Computer-readable recording medium" on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet.

"Computer program" refers to a data processing method written in any computer language and can have software codes and binary codes in any format. The computer program can be a dispersed form in the form of a plurality of modules or libraries, or can perform various functions in collaboration with a different program such as the OS. Any known configuration in the image-reading processing apparatus according to the embodiment can be used for reading the recording medium. Similarly, any known process procedure for reading or installing the computer program can be used.

The storage unit 106 and the storage unit 206 (distribution package storage file 106*a*, inventory information file 106*b*, distribution package storage file 206*a* to download time period file 206*d*) is a fixed disk device such as RAM, ROM, and hard disk or flexible disk, optical disk, and stores therein various programs, tables, databases required for various processes and opening websites.

The terminal device 100 and the server device 200 can also be connected to any existing personal computer, workstation, etc. and can be operated by executing software (that includes computer program, data, etc.) that implements the method according to the present invention in the personal computer or workstation.

Moreover, a specific manner of distribution, and integration of the apparatus is not limited to the example as described in the drawing. A part or all of the apparatus can be distributed or integrated functionally or physically in an arbitrary unit depending on various additions.

According to the present invention, there is an advantage that the application timing can be controlled in the server avoiding time periods to be used for a normal operation of the terminals. According to the present invention, there is an advantage that while avoiding downloads to be performed at a specific date and time from many terminals at the same time, the terminals can be controlled to perform download at different timings before the application start timing.

According to the present invention, there is an advantage that the server can select a target terminal from a plurality of terminals and cause the terminal to perform download, application, and the like at an appropriate timing.

According to the present invention, there is an advantage that, while the server causes the terminal to arbitrarily download the distribution package before the application start timing, when cancelling the application of the distribution package, even if the distribution package has been downloaded, the server can issue a cancel request and perform cancellation of the application independent of the power on/off status of the terminal.

According to the present invention, there is an advantage that the server can control the download timing in the terminal, and deletion of the distribution package which has been downloaded, at an appropriate timing independent of the transmission timing of the inquiry information from the terminal.

According to the present invention, there is an advantage that the server can check the download status and the application status of the distribution package in the terminal and perform version management of the downloaded or applied distribution package.

According to the present invention, there is an advantage that, since the server performs a control so that the distribution package can be received in response to the acquisition request or the inquiry information only when the current date and time is in a downloadable time period with respect to the target distribution type information, the server does not allow download of a distribution package, which affects the normal operation of the terminal, such as when the distribution package has a large size and affects the network, in a time period when the terminal is in a normal operation, and the server causes the terminal to download only a distribution package for changing the scheduler and the download timing of the terminal so that such a distribution package affecting the normal operation of the terminal is downloaded at an appropriate timing, so that the server can cause the terminal to download the distribution package at an appropriate timing without affecting the normal operation of the terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A distribution system, comprising:
a server device including a storage unit and a control unit, and
a terminal device including a storage unit and a control unit,
wherein
the server device and the terminal device are connected to each other via a network,
the storage unit of the server device includes:
a distribution package storage unit configured to store a distribution package including a resource to be applied to the terminal device, an application script to apply the resource, and application start timing information related to an application start timing when the application script is executed, wherein the application start timing is a timing to start to execute the applications, and is defined in the distribution package, and
a target terminal specification information storage unit configured to store target terminal information that specifies, among a plurality of terminal devices, the terminal device to be the distribution target or the application target of the distribution package stored in the distribution package storage unit,
the control unit of the terminal device includes:
an inquiring unit configured to transmit inquiry information to the server device for inquiring about the distribution package to be a distribution target or an application target,
an acquisition request transmitting unit configured to transmit an acquisition request for the distribution package to the server device based on answer information when receiving the answer information from the server device;
a distribution package acquiring unit configured to receive the distribution package from the server device and store the distribution package into the storage unit of the terminal device;
an application start determining unit configured to determine whether current date and time is the application start timing based on the application start timing information included in the distribution package stored in the storage unit of the terminal device; and
a resource applying unit configured to apply the resource by executing the application script when the current date and time is determined to be the application start timing by the application start determining unit, and
the control unit of the server device includes:
an answer information transmitting unit configured to transmit the answer information about the distribution package to be the distribution target or the application target to the terminal device based on the target terminal information stored in the target terminal specification information storage unit when receiving the inquiry information;
an acquisition request receiving unit configured to receive the acquisition request for the distribution package from the terminal device; and
a distribution package transmitting unit configured to transmit the distribution package stored in the distribution package storage unit to the terminal device when the acquisition request is received by the acquisition request receiving unit.

2. The distribution system according to claim 1, wherein
the target terminal specification information storage unit is configured to store the target terminal information that specifies the terminal device that is not the application target of the distribution package,
the answer information transmitting unit is configured to transmit a cancel request for the distribution package that is not the application target as the answer information based on the target terminal information stored in the target terminal specification information storage unit when receiving the inquiry information, and
the control unit of the terminal device further includes:
a cancel executing unit configured to delete the distribution package that is received by the distribution package acquiring unit and is not applied by the resource applying unit from the storage unit when receiving the cancel request.

3. The distribution system according to claim 1, wherein
the control unit of the server device further includes:
a notice transmitting unit is configured to transmit a distribution notice to the terminal device that is the distribution target and to transmit a cancel notice to the terminal device that is not the application target on the basis of the target terminal information stored in the target terminal specification information storage unit; and
the inquiring unit is configured to transmit the inquiry information to the server device when receiving the distribution notice or the cancel notice.

4. The distribution system according to claim 1, wherein
the distribution package further includes a name and a version of the distribution package,
the control unit of the terminal device further includes:
an inventory information transmitting unit configured to transmit inventory information in which any one of a receiving result by the distribution package acquiring unit and an application result by the resource applying unit or both are associated with the name and the version of the distribution package and stored to the server device, and
the control unit of the server device further includes:
an inventory information storing unit configured to receive the inventory information from the terminal device and stores the inventory information into the storage unit of the server device.

5. The distribution system according to claim 1, wherein
the storage unit of the server device further includes:
a download time period information storage unit is configured to store download time period information regarding a downloadable time period and a non-downloadable time period, the distribution package further includes distribution type information regarding whether download time period limitation is enabled or disabled, and the distribution package transmitting unit or the answer information transmitting unit is configured to control not to allow download with respect to the received acquisition request or the received inquiry information when the download time period limitation is enabled based on the distribution type information included in the distribution package stored in the distribution package storage unit and current date and time is in the non-downloadable time period based on the download time period information stored in the download time period information storage unit.

6. A server device connectable to a terminal device via a network, the server device comprising a storage unit and a control unit, wherein the storage unit includes:
   a distribution package storage unit configured to store a distribution package including a resource to be applied to the terminal device, an application script to apply the resource, and application start timing information related to an application start timing when the application script is executed, wherein the application start timing is a timing to start to execute the applications, and is defined in the distribution package, and
   a target terminal specification information storage unit configured to store target terminal information that specifies, among a plurality of terminal devices, the terminal device to be a distribution target or an application target of the distribution package stored in the distribution package storage unit, the control unit includes:
   an answer information transmitting unit configured to transmit answer information about the distribution package to be the distribution target or the application target to the terminal device based on the target terminal information stored in the target terminal specification information storage unit when receiving inquiry information;
   an acquisition request receiving unit configured to receive an acquisition request for the distribution package from the terminal device; and
   a distribution package transmitting unit configured to transmit the distribution package stored in the distribution package storage unit to the terminal device when the acquisition request is received by the acquisition request receiving unit, to apply the resource by executing the application script when current date and time is determined to be the application start timing based on the application start timing information included in the distribution package.

7. A terminal device connectable via a network to a server device including a storage unit, the terminal device comprising a storage unit and a control unit, wherein the storage unit of the server device includes:
   a distribution package storage unit configured to store a distribution package including a resource to be applied to the terminal device, an application script to apply the resource, and application start timing information related to an application start timing when the application script is executed, wherein the application start timing is a timing to start to execute the applications, and is defined in the distribution package, and
   a target terminal specification information storage unit configured to store target terminal information that specifies, among a plurality of terminal devices, the terminal device to be the distribution target or the application target of the distribution package stored in the distribution package storage unit, the control unit includes:
   an inquiring unit configured to transmit inquiry information to the server device for inquiring about the distribution package to be a distribution target or an application target,
   an acquisition request transmitting unit configured to transmit an acquisition request for the distribution package to the server device based on answer information when receiving the answer information from the server device;
   a distribution package acquiring unit configured to receive the distribution package from the server device based on the acquisition request and store the distribution package into the storage unit of the terminal device;
   an application start determining unit configured to determine whether current date and time is the application start timing based on the application start timing information included in the distribution package stored in the storage unit of the terminal device; and
   a resource applying unit configured to apply the resource by executing the application script when the current date and time is determined to be the application start timing by the application start determining unit.

8. A distribution method executed by a distribution system including a server device having a storage unit and a control unit, and a terminal device having a storage unit and a control unit, wherein the server device and the terminal device are connected to each other via a network, the storage unit of the server device includes:
   a distribution package storage unit that stores a distribution package including a resource to be applied to the terminal device, an application script to apply the resource, and application start timing information related to an application start timing when the application script is executed, wherein the application start timing is a timing to start to execute the applications, and is defined in the distribution package, and
   a target terminal specification information storage unit configured to store target terminal information that specifies, among a plurality of terminal devices, the terminal device to be the distribution target or the application target of the distribution package stored in the distribution package storage unit, the method comprises:
   an acquisition request transmitting step of transmitting an acquisition request for the distribution package to the server device;
   an acquisition request receiving step of receiving the acquisition request for the distribution package from the terminal device;
   a distribution package transmitting step of transmitting the distribution package stored in the distribution package storage unit to the terminal device when the acquisition request is received at the acquisition request receiving step;
   a distribution package acquiring step of receiving the distribution package from the server device and storing the distribution package into the storage unit of the terminal device;
   an application start determining step of determining whether current date and time is the application start timing based on the application start timing information included in the distribution package stored in the storage unit of the terminal device; and a resource applying step of applying the resource by executing the application script when the current date and time is determined to be the application start timing at the application start determining step, wherein the acquisition request transmitting step, the distribution package acquiring step, the application start determining step and the resource applying step are executed by the control unit of the terminal device, and the acquisition request receiving step and the distribution package transmitting step are executed by the control unit of the server device.

9. A distribution method executed by a server device connected to a terminal device via a network, the server device including a storage unit and a control unit, wherein the storage unit includes:

a distribution package storage unit that stores a distribution package including a resource to be applied to the terminal device, an application script to apply the resource, and application start timing information related to an application start timing when the application script is executed, wherein the application start timing is a timing to start to execute the applications, and is defined in the distribution package, and a target terminal specification information storage unit configured to store target terminal information that specifies, among a plurality of terminal devices, the terminal device to be a distribution target or an application target of the distribution package stored in the distribution package storage unit, the method comprises:

an acquisition request receiving step of receiving an acquisition request for the distribution package transmitted from the terminal device; and a distribution package transmitting step of transmitting the distribution package stored in the distribution package storage unit to the terminal device when the acquisition request is received at the acquisition request receiving step, to apply the resource by executing the application script when current date and time is determined to be the application start timing based on the application start timing information included in the distribution package, wherein the steps are executed by the control unit.

10. A distribution method executed by a terminal device connected via a network to a server device including a storage unit, the terminal device including a storage unit and a control unit, wherein the storage unit of the server device includes:

a distribution package storage unit that stores a distribution package including a resource to be applied to the terminal device, an application script to apply the resource, and application start timing information related to an application start timing when the application script is executed, wherein the application start timing is a timing to start to execute the applications, and is defined in the distribution package, and a target terminal specification information storage unit configured to store target terminal information that specifies, among a plurality of terminal devices, the terminal device to be the distribution target or the application target of the distribution package stored in the distribution package storage unit, the method comprises:

an acquisition request transmitting step of transmitting an acquisition request for the distribution package to the server device;

a distribution package acquiring step of receiving the distribution package transmitted from the server device based on the acquisition request and storing the distribution package into the storage unit of the terminal device;

an application start determining step of determining whether current date and time is the application start timing based on the application start timing information included in the distribution package stored in the storage unit of the terminal device; and a resource applying step of applying the resource by executing the application script when the current date and time is determined to be the application start timing at the application start determining step, wherein the steps are executed by the control unit.

* * * * *